United States Patent
Choi

(10) Patent No.: US 7,525,819 B2
(45) Date of Patent: Apr. 28, 2009

(54) SWITCHING MODE POWER SUPPLY AND METHOD FOR GENERATING A BIAS VOLTAGE

(75) Inventor: Hang-Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 0 days.

(21) Appl. No.: 11/364,711

(22) Filed: Feb. 28, 2006

(65) Prior Publication Data
US 2006/0196757 A1 Sep. 7, 2006

(30) Foreign Application Priority Data
Mar. 2, 2005 (KR) ............... 10-2005-0017238

(51) Int. Cl.
*H02M 3/335* (2006.01)
(52) U.S. Cl. ............ 363/16; 363/21.02; 363/21.04; 363/21.08; 363/21.12; 363/49; 323/238; 323/901
(58) Field of Classification Search ............ 363/21.02, 363/21.04, 21.08, 21.12, 49; 323/238, 901
See application file for complete search history.

(56) References Cited

U.S. PATENT DOCUMENTS

| 5,734,564 | A  | * | 3/1998 | Brkovic | 363/21.16 |
| 5,923,543 | A  | * | 7/1999 | Choi | 363/21.02 |
| 7,061,780 | B2 | * | 6/2006 | Yang et al. | 363/21.16 |
| 2004/0037098 | A1 | * | 2/2004 | Konno | 363/49 |
| 2004/0109334 | A1 | * | 6/2004 | Murakami | 363/49 |
| 2006/0152951 | A1 | * | 7/2006 | Fagnani et al. | 363/49 |

* cited by examiner

*Primary Examiner*—Akm E Ullah
*Assistant Examiner*—Arun Williams
(74) *Attorney, Agent, or Firm*—Sidley Austin LLP

(57) ABSTRACT

A switching mode power supply and method for generating a bias voltage is described. The bias voltage is generated by using a current source coupled to a primary coil of a transformer during the start-up of the switching mode power supply. The generation of the bias voltage through the current source is stopped at a second time, a delay time after a first time when the bias voltage becomes essentially equal to a reference voltage that is an operational voltage of a PWM controller. The switching operation of a main switch is started after the first time, when the bias voltage exceeded the operational voltage. In this interval the bias voltage is also generated by the secondary coil of the transformer.

13 Claims, 3 Drawing Sheets

SWITCHING MODE POWER SUPPLY AND METHOD FOR GENERATING A BIAS VOLTAGE

CROSS REFERENCE TO RELATED APPLICATION

This application claims priority to and the benefit of Korea Patent Application No. 10-2005-0017238 filed on Mar. 2, 2005 in the Korean Intellectual Property Office, the entire content of which is incorporated herein by reference.

BACKGROUND OF THE INVENTION

1. Field of the Invention

The present invention relates to a switching mode power supply (SMPS). More specifically, the present invention relates to an SMPS for generating a bias voltage of a pulse width modulator (PWM) controller.

2. Description of the Related Art

An SMPS converts a DC voltage into at least one other DC voltage. In some systems the DC output voltage is controlled to be greater or lesser than the input voltage. The SMPS is applied to power electronic devices, and in particular, battery power supply devices such as mobile phones and laptop computers.

It is required to supply a bias voltage Vcc to a PWM controller to control the operation of a main switch in order to operate an SMPS in the initial stage of driving the SMPS. A general method for supplying a bias voltage to the PWM controller is to supply the bias voltage Vcc by the SMPS in the initial driving stage of the SMPS. After the initial driving stage the main switch begins to operate. This makes it possible to supply the bias voltage from the secondary coil of a transformer. A terminal for supplying the bias voltage (bias voltage terminal) and a terminal coupled to the main switch (main switch terminal) are high voltage terminals. Reducing the number of high voltage terminals advantageously simplifies the system design.

U.S. Pat. No. 5,014,178, incorporated herein by reference in its entirety, discloses a conventional system and method for unifying the above bias voltage terminal and main switch terminal. The system of the patent (i) supplies the bias voltage until the voltage at the bias voltage terminal reaches a first reference voltage in the initial driving stage; (ii) in addition supplies the same voltage by using the secondary coil of the transformer during the period when the voltage rises from the first reference voltage to a second reference voltage; and (iii) supplies the bias voltage by using the secondary coil of the transformer alone when the bias voltage exceeds the second reference voltage. However, this conventional system has a complicated design since it uses two reference voltages to supply the bias voltage. Also, in the conventional system information on the output voltage in fed back at the same terminal where the bias voltage is supplied. The conventional method provides information on the output voltage through the secondary coil of the transformer indirectly, and hence the output voltage may not be conveniently regulated.

SUMMARY

Briefly and generally, embodiments of the present invention include a switching mode power supply, operable to generate bias voltage in a simple manner, improving the regulation of the output voltage.

In some embodiments, a switching mode power supply includes a primary coil of a transformer and a main switch, and it generates an output voltage by switching the main switch. A first terminal of the primary coil of the transformer is electrically coupled to a rectified DC voltage signal, and a second terminal of the primary coil is electrically coupled to the main switch. The switching mode power supply includes: a bias voltage generator including an auxiliary coil of the transformer and a capacitor that is electrically coupled to a first terminal and a second terminal of the auxiliary coil of the transformer; an initial bias voltage generator, operable to charge the capacitor from the second terminal of the primary coil of the transformer during the start-up of the switching mode power supply; and a pulse width modulator controller, operable to receive a first voltage charged in the capacitor through a first terminal, to stop the charging of the capacitor at a second time, which is a delay time after a first time at which the first voltage becomes essentially equal to a reference voltage, and to start to switch the main switch.

In other embodiments, a method for generating a bias voltage in a switching mode power supply, the power supply including a primary coil of a transformer, a main switch, a pulse width modulator controller, and a capacitor wherein a first terminal of the primary coil of the transformer is electrically coupled to a rectified DC voltage signal, a second terminal of the primary coil thereof is electrically coupled to the main switch, the pulse width modulator controller is operable to control the switching of the main switch, and the capacitor electrically coupled to a first terminal and a second terminal of the secondary coil of the transformer, operable to supply the bias voltage to the pulse width modulator controller, the method including: charging the first capacitor by a current source that is electrically coupled between the first terminal of the primary coil of the transformer and the capacitor during the start-up of the switching mode power supply; comparing a voltage of the capacitor and a reference voltage that is an operational voltage of the pulse width modulator controller; and stopping the charging of the capacitor by the current source at a second time that is a predetermined delay time after the first time when the voltage becomes essentially equal to the reference voltage.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION

In the following detailed description various embodiments will be described. The scope of the invention, however, is not limited to the disclosed embodiments and is intended to be much broader. Accordingly, the drawings and description are to be regarded as illustrative in nature, and not restrictive.

Figure 1:
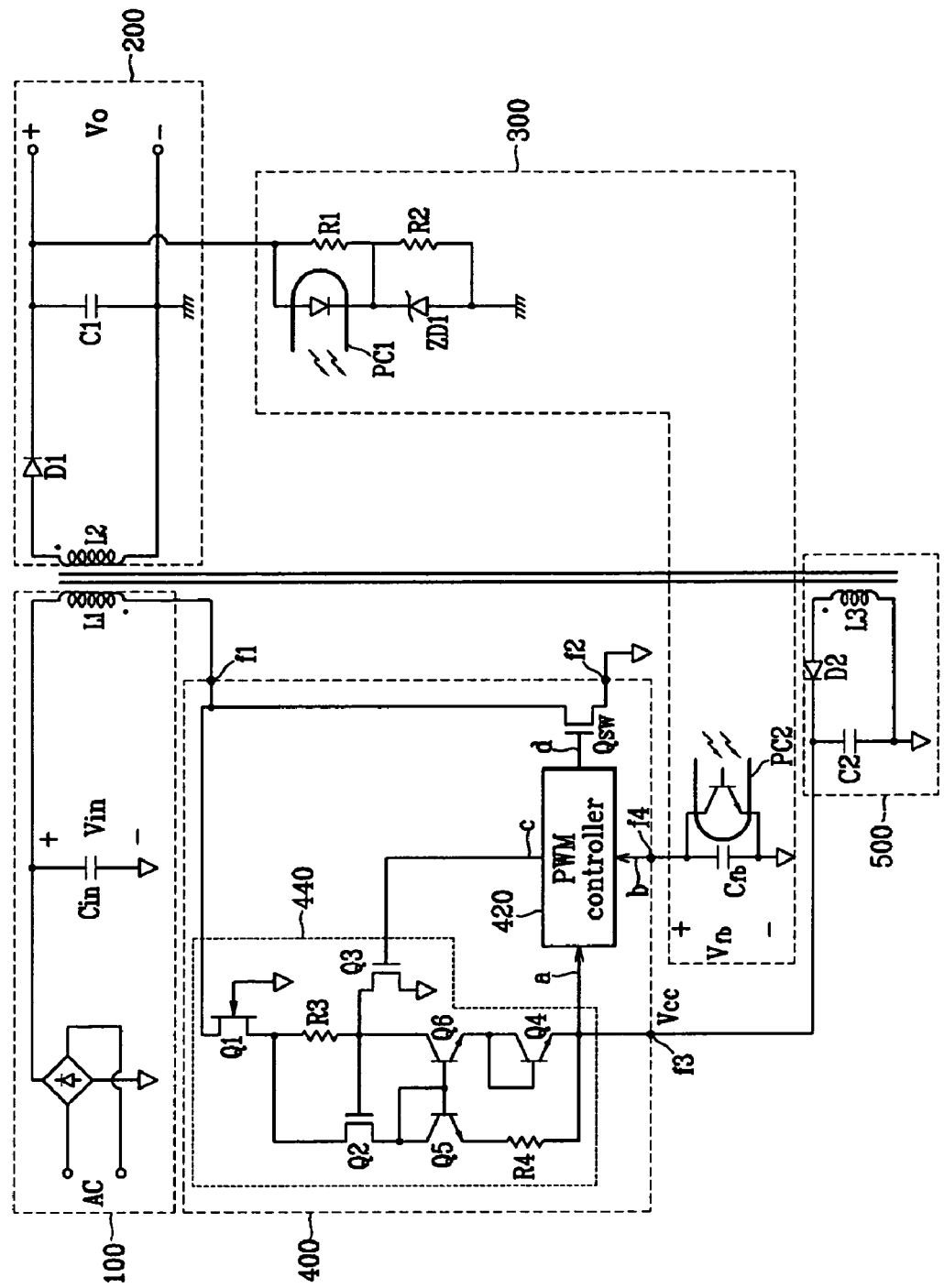
FIG. 1 shows a switching mode power supply (SMPS) according to an embodiment of the present invention.

FIG. 1 shows a circuit diagram of a switching mode power supply (SMPS) according to an embodiment of the present invention. The SMPS includes a power supply 100, an output unit 200, a feedback circuit 300, a switching controller 400, and a bias voltage supply 500.

Power supply 100 includes a bridge diode BD for rectifying AC input voltages, a capacitor Cin for smoothing the rectified voltage, and a primary coil L1 of a transformer having a first terminal coupled to the capacitor Cin. A second terminal of primary coil L1 of the transformer is coupled to a terminal f1 of switching controller 400. Power supply 100 converts the AC voltage into a DC voltage Vin by bridge diode BD and capacitor Cin. Power supply 100 supplies power to the secondary coil of output unit 200 according to the duty of a switching MOS transistor Qsw, which is included in switching controller 400.

Output unit 200 includes a diode D1 having an anode coupled to a first terminal of the secondary coil L2 of the transformer, and a capacitor C1 coupled between a cathode of the diode D1 and a ground. A second terminal of secondary coil L2 of the transformer is grounded, and the voltage at capacitor C1 is an output voltage Vout.

Feedback circuit 300 includes a resistor R1 having a first terminal coupled to the cathode of diode D1, a resistor R2 coupled between a second terminal of the resistor R1 and the ground, a Zener diode ZD1 having a cathode coupled to the second terminal of the resistor R1 and a grounded anode, a photodiode PC1 having an anode coupled to the first terminal of resistor R1 and a cathode coupled to the second terminal of resistor R1. Further, feedback circuit 300 also includes a phototransistor PC2 coupled between a feedback terminal f4 of switching controller 400 and the ground, and a feedback capacitor Cfb coupled in parallel to phototransistor PC2 and coupled between the terminal f4 and the ground. Photodiode PC1 and phototransistor PC2 form a photocoupler. Output voltage Vout is divided by resistors R3 and R4. The current flowing to photodiode PC1 is representative of output voltage Vout, and the current flowing through phototransistor PC2 is representative of the current flowing through photodiode PC1. Accordingly, feedback voltage Vfb at feedback capacitor Cfb is inversely proportional to output voltage Vout. This system regulates output-voltage Vout to be essentially constant.

Bias voltage supply 500 includes an auxiliary coil L3 of the transformer, a diode D2 having an anode coupled to a first terminal of auxiliary coil L3 of the transformer, and a capacitor C2 coupled between the cathode of diode D2 and the ground. A node of capacitor C2 and diode D2 is coupled to a terminal f3 of switching controller 400. Auxiliary coil L3 of the transformer and diode D2 are operable to apply bias voltage Vcc to capacitor C2 through an initial bias voltage supply 440.

Switching controller 400 includes PWM controller 420, initial bias voltage supply 440, and a switching MOS transistor Qsw functioning as a main switch. A drain of switching MOS transistor Qsw is coupled to the second terminal of primary coil L1 of through a terminal f1, a source of Qsw is grounded through a terminal f2, and a gate of Qsw is coupled to an output terminal of PWM controller 420. The main switch can be other than a MOSFET transistor. Switching MOS transistor Qsw can be formed in the switching controller integrated circuit (IC) as shown in FIG. 1, or it can be provided outside the IC.

FIG. 1 illustrates that initial bias voltage supply 440 includes a transistor Q1 having a drain coupled to the second terminal of primary coil L1 and a grounded gate; a resistor R3 having a first terminal coupled to the source of transistor Q1; a transistor Q2 having a drain coupled to the source of transistor Q1 and a gate coupled to the second terminal of resistor R2; a transistor Q5 having a collector and a base coupled to a source of transistor Q2; a transistor Q6 having a collector coupled to the gate of transistor Q2 and a base coupled to a base of transistor Q5; a resistor R4 coupled between an emitter of transistor Q5 and terminal f3 (i.e., the first terminal of capacitor C2); a transistor Q4 having a collector and a base coupled to the collector of transistor Q6; and a transistor Q3 having a drain coupled to the gate of transistor Q2, a grounded source, and a gate coupled to PWM controller 420.

The above-configured initial bias voltage supply 440 is operable to apply bias voltage Vcc to capacitor C2 in the initial phase of the operation ("start-up"), and to stop applying bias voltage Vcc when receiving a signal for turning on transistor Q3 from PWM controller 420, as will now be described.

PWM controller 420 receives bias voltage Vcc through a line A and feedback voltage Vfb through a line B. During start-up PWM controller 420 outputs a signal through a line D to switch switching MOS transistor Qsw, when bias voltage Vcc at line A exceeds a reference voltage Vref. Further, PWM controller 420 outputs a signal for turning off transistor Q3 through a line C a predetermined time after starting the switching of switching MOS transistor Qsw. PWM controller 420 controls the duty of switching MOS transistor Qsw in relation to feedback voltage Vfb after having started the switching of switching MOS transistor Qsw.

Figure 2:
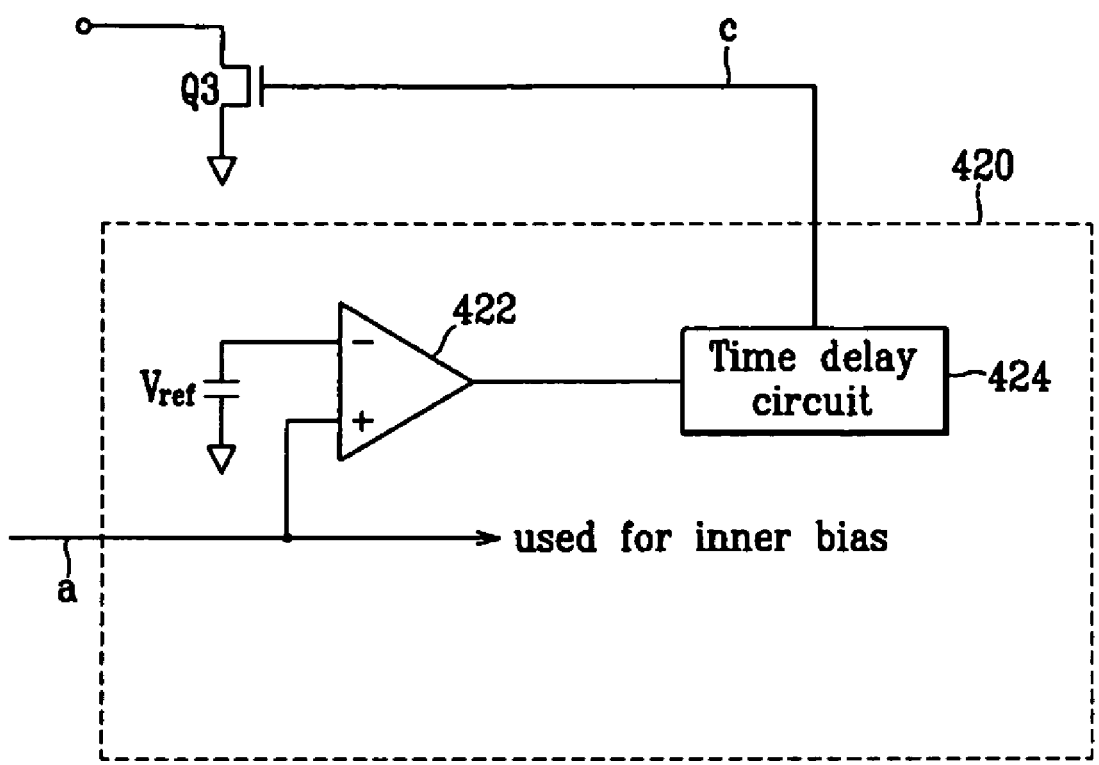
FIG. 2 shows a configuration of a PWM controller according to an embodiment of the present invention.

FIG. 2 illustrates an embodiment of PWM controller 420 for turning on transistor Q3 after having received bias voltage Vcc during start-up. Some embodiments include the circuits of U.S. Pat. No. 5,014,178, which are described there in more detail.

PWM controller 420 includes a comparator 422 and a time delay circuit 424. A non-inverting terminal (+) of comparator 422 is coupled to line A, and an inverting terminal (−) thereof is coupled to reference voltage terminal Vref. Time delay circuit 424 receives an output from comparator 422 and outputs a signal for turning on transistor Q3 through line C a predetermined time delay Tdelay after output signal of comparator 422 turns HIGH. Bias voltage Vcc is applied to PWM controller 420 through line A to bias internal circuits. Time delay Tdelay represents a time interval from a time when PWM controller 420 starts the switching of switching MOS transistor Qsw, to a time of normal operation. Time delay circuit 424 can include an independent counter circuit or a soft-start counter circuit.

Figure 3:
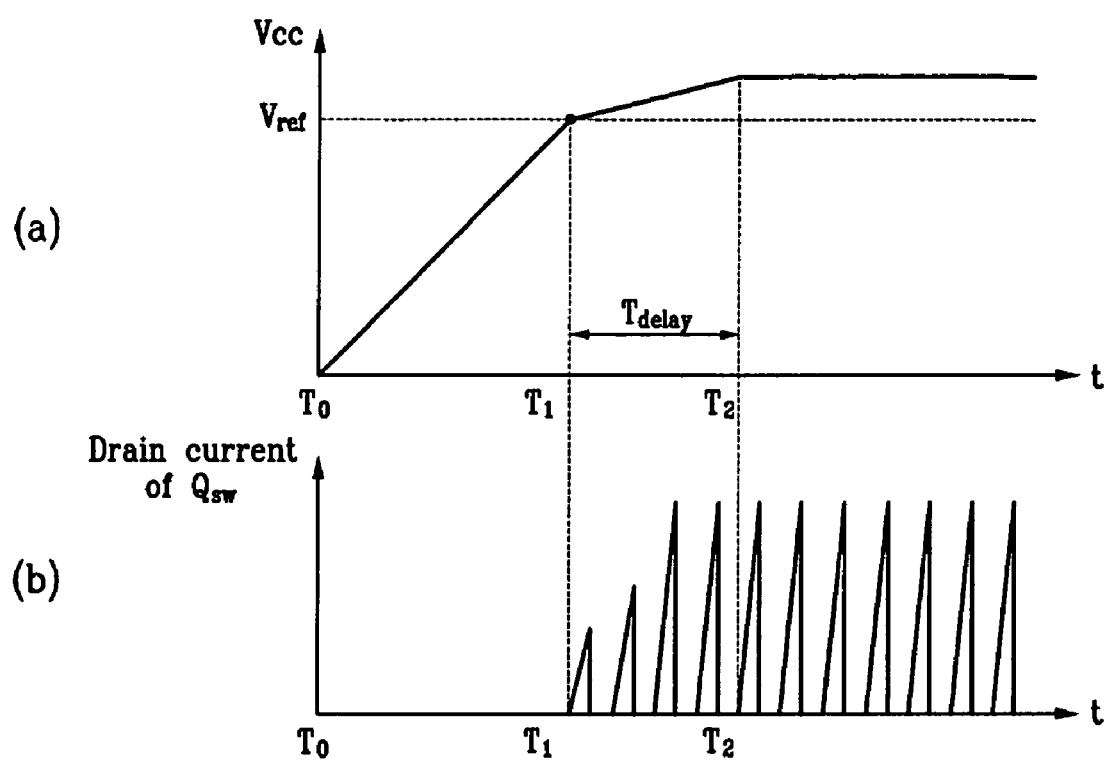
FIG. 3(a) shows a graph of a bias voltage during the start-up of the SMPS.
FIG. 3(b) shows a graph of a drain current of a switching MOS transistor corresponding to the bias voltage in FIG. 3(a).

FIG. 3 illustrate a method of generating bias voltage Vcc during operation.

FIG. 3(a) shows a graph of bias voltage Vcc during start-up.

FIG. 3(b) shows a graph of a drain current of switching MOS transistor Qsw when the bias voltage given in FIG. 3(a) is applied.

During an interval from the initial drive time $T_0$ to the time $T_1$, switching MOS transistor Qsw is not conducting (is "OFF") and capacitor C2 is charged through transistor Q1. In some embodiments transistor Q1 is a j-FET. Therefore, it is in the ON state since its gate is grounded. The current caused by input voltage Vin flows to resistor R3 so that transistor Q2 is self-biased and is turned on, since the transistor Q1 maintains the On state. Transistors Q5 and Q6 form a current mirror and transistor Q4 is diode-connected and hence transistors Q4, Q5, and Q6 and resistor R4 form a current source. The voltage at resistor R4 corresponds to the base-emitter voltage $V_{BE.Q4}$ Of transistor Q4, and hence the current of the current source becomes $V_{BE.Q4}/R4$. Therefore, capacitor C2 is charged through the current source, and bias voltage Vcc at capacitor C2 gradually increases during the period from $T_0$ to $T_1$, as shown in FIG. 3(a). Switching MOS transistor Qsw is OFF, thus it does not generate a drain current during the period from $T_0$ to $T_1$.

At time $T_1$, bias voltage Vcc becomes equal to reference voltage Vref, the operating voltage of PWM controller 420. This starts the operation of PWM controller 420 at $T_1$. Accordingly, PWM controller 420 starts the switching of switching MOS transistor Qsw to generate a drain current in Qsw. Correspondingly, voltage generator 500 starts operating and a voltage is generated in capacitor C2.

When bias voltage Vcc exceeds reference voltage Vref at time $T_1$, comparator 422 of PWM controller 420 outputs a HIGH signal. Time delay circuit 424 outputs a signal for turning on transistor Q3 at time $T_2$, a predetermined time delay Tdelay after $T_1$. Accordingly, capacitor C2 continues to be charged by the current source including transistors Q4, Q5, and Q6, and resistor R4 during the period from $T_1$ to $T_2$.

During the ($T_1$, $T_2$) period capacitor C2 is charged by both bias voltage generator 500 and the current source. Accordingly, as shown in FIG. 3(a), bias voltage Vcc continues to increase above reference voltage Vref in this period.

Time delay circuit 424 outputs a signal for turning on transistor Q3 at time $T_2$. When transistor Q3 is turned on, transistor Q2 is turned off. This decouples the above current source from transistor Q1, stopping the charging of capacitor C2 by the current source.

Since switching MOS transistor Qsw continues switching after T2, a voltage is generated across capacitor C2 by bias voltage generator 500 after $T_2$. This voltage is continuously generated across capacitor C2 since PWM controller 420 operates normally after $T_2$. Time delay Tdelay represents the delay from the time when PWM controller 420 starts its operation to the time when it performs a normal operation. Its value is to be selected appropriately.

In embodiments bias voltage Vcc can be continuously increased from $T_1$ to $T_2$ by using a single reference voltage Vref and a simple time delay circuit 424. The reduction of bias voltage Vcc is prevented by turning on transistor Q3 after time delay Tdelay instead of turning it on at $T_1$. In these embodiments, problems arising from PWM controller 420 not operating instantly after $T_1$ are prevented. Also, the reliability of regulation is increased since feedback terminal f4 and supply terminal f3 of bias voltage Vcc are separated, as shown in FIG. 1, instead of being a shared terminal.

While this invention has been described in connection with some embodiments, it is understood that the invention is not limited to the disclosed embodiments, but, on the contrary, is intended to cover various modifications and equivalent arrangements included within the spirit and scope of the appended claims.

What is claimed is:

1. A switching mode power supply including a primary coil of a transformer and a main switch, which generates an output voltage by switching the main switch, the switching mode power supply comprising:
   a bias voltage generator including an auxiliary coil of the transformer and a capacitor electrically coupled to a first terminal and a second terminal of the auxiliary coil of the transformer;
   an initial bias voltage generator, which charges the capacitor from the second terminal of the primary coil of the transformer during a start-up of the switching mode power supply, wherein a first terminal of the primary coil of the transformer is electrically coupled to a rectified DC voltage signal and a second terminal of the primary coil is electrically coupled to the main switch; and
   a pulse width modulator controller, which receives a first voltage of the capacitor through a first terminal and starts switching the main switch,
   wherein the pulse width modulator controller comprises:
   a time delay circuit, coupled to the initial bias voltage generator, which stops the charging of the capacitor at a second time, which is a delay time after a first time at which the first voltage is essentially equal to a reference voltage, and starts switching the main switch.

2. The switching mode power supply of claim 1, wherein the initial bias voltage generator charges the capacitor up to the second time after the start-up.

3. The switching mode power supply of claim 2, wherein the bias voltage generator charges the capacitor when the main switch starts switching.

4. The switching mode power supply of claim 3, wherein the bias voltage generator charges the capacitor after the second time.

5. The switching mode power supply of claim 1, wherein the pulse width modulator controller receives output voltage information corresponding to the output voltage though a second terminal other than the first terminal, and controls the duty of the main switch corresponding to the output voltage information.

6. The switching mode power supply of claim 1, wherein the pulse width modulator controller further comprises:
   a comparator, having a first terminal coupled to the first voltage, a second terminal coupled to the reference voltage, and an output terminal, coupled to the time delay circuit to output the result of a comparison of the first voltage and the reference voltage;
   wherein the time delay circuit is coupled
      to the output terminal of the comparator, which receives an output signal from the comparator, to delay the output signal for a predetermined time after the time when the first voltage becomes essentially equal to the reference voltage; and
      to the initial bias voltage generator to transmit a signal to the initial bias voltage generator to stop the charging of the capacitor.

7. The switching mode power supply of claim 6, wherein the initial bias voltage generator comprises:
   a first transistor having a drain electrically coupled to the second terminal of the primary coil of the transformer, a gate electrically coupled to the second terminal of the primary coil of the transformer through a resistor, and a source;
   a current source being electrically coupled to the first transistor for generating a predetermined current; and
   a second transistor having a drain electrically coupled to the gate of the first transistor, a gate for receiving the signal transmitted by the time delay circuit, and a grounded source.

8. The switching mode power supply of claim 7, wherein the current source comprises:
   a third transistor having a collector and a base electrically coupled to the source of the first transistor, and an emitter;
   a fourth transistor having a collector electrically coupled to the gate of the first transistor, and a base electrically coupled to the base of the third transistor;
   a second resistor electrically coupled between the emitter of the third transistor and the capacitor; and
   a fifth transistor having a collector and a base electrically coupled to the base of the fourth transistor, and an emitter electrically coupled to the capacitor.

9. The switching mode power supply of claim 8, wherein the initial bias voltage generator further comprises a sixth transistor having a drain electrically coupled to the primary coil of the transformer, a source electrically coupled to the drain of the first transistor, and a grounded gate, the sixth transistor operable to maintain an ON state.

10. A method for generating a bias voltage in a switching mode power supply including a primary coil of a transformer, a main switch, a pulse width modulator controller, and a capacitor wherein a first terminal of the primary coil of the transformer is electrically coupled to a rectified DC voltage signal, a second terminal of the primary coil is electrically coupled to the main switch, the pulse width modulator controller controlling a switching of the main switch, and the capacitor electrically coupled to a first terminal and a second terminal of an auxiliary coil of the transformer, supplying the bias voltage to the pulse width modulator controller, the method comprising:

charging the capacitor by a current source, electrically coupled between the second terminal of the primary coil of the transformer and the capacitor, during a start-up of the switching mode power supply;

comparing a first voltage of the capacitor and a reference voltage that is an operational voltage of the pulse width modulator controller; and stopping the charging of the capacitor by the current source at a second time that is a predetermined delay time after a first time when the first voltage becomes essentially equal to the reference voltage.

11. The method of claim 10, further comprising:

starting the switching of the main switch by the pulse width modulator controller after the first time; and charging the capacitor by the auxiliary coil of the transformer.

12. The method of claim 10, wherein the capacitor is charged by the auxiliary coil of the transformer after the second time.

13. The method of claim 11, wherein the capacitor is charged by the auxiliary coil of the transformer after the second time.

* * * * *